Patented Mar. 23, 1943

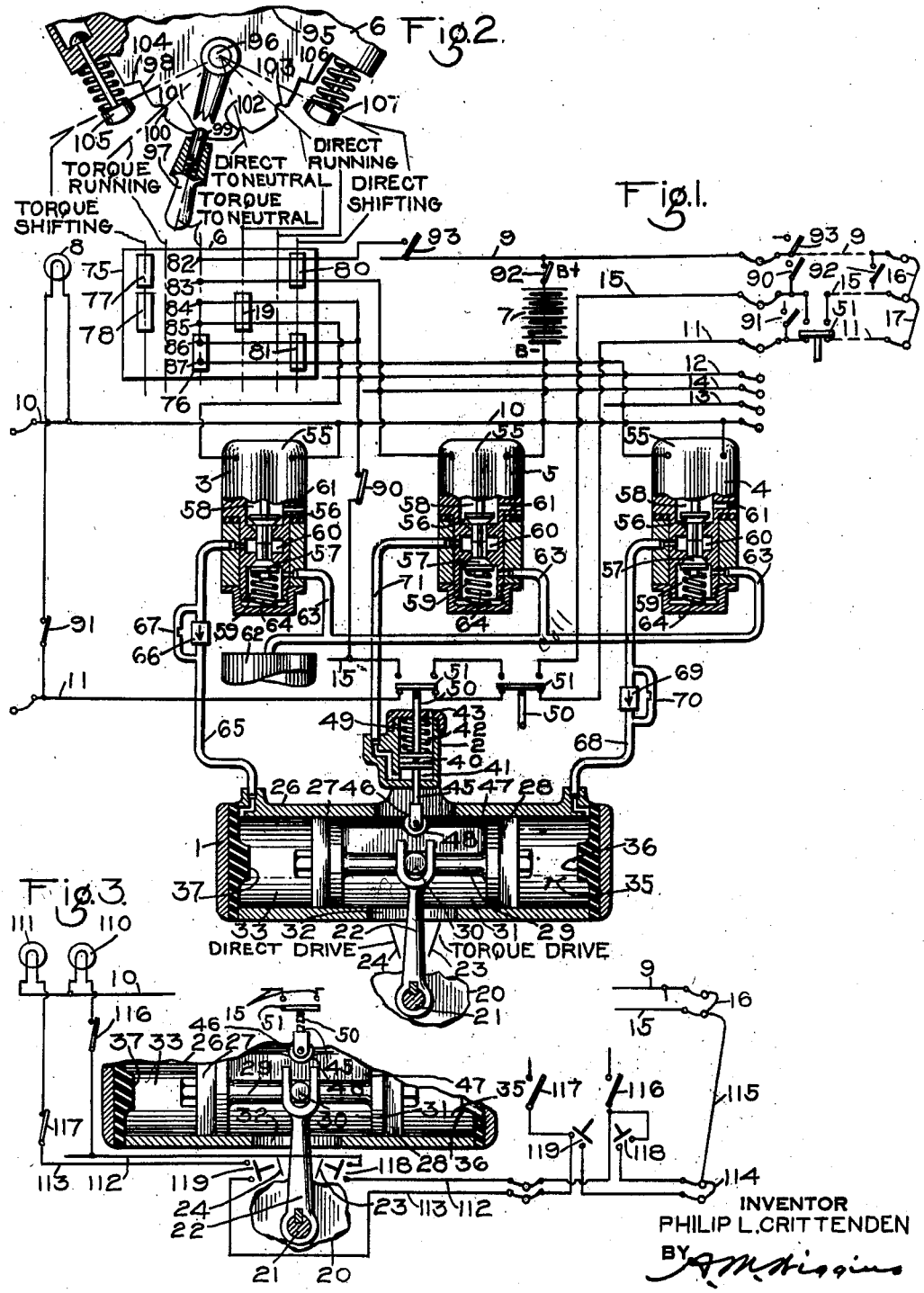

2,314,444

UNITED STATES PATENT OFFICE 2,314,444

CLUTCH CONTROL MECHANISM

Philip L. Crittenden, Edgewood, Pa., assignor to The Westinghouse Air Brake Company, Wilmerding, Pa., a corporation of Pennsylvania Application April 29, 1941, Serial No. 390,862

21 Claims. (Cl. 105—62)

This invention relates to control mechanisms and more particularly to remote controlled power operated means for controlling the positioning of a device such as a multiposition clutch.

In certain railway vehicles propelled by internal combustion engines of the Diesel type a double friction clutch is provided which has a neutral position for disconnecting the propulsion engine from the drive wheels of the vehicle. At one side of the neutral position the clutch has a drive position, known as torque drive, for connecting the engine to the drive wheels through a hydraulic power transmission device. At the opposite side of the neutral position the clutch has another drive position, known as direct drive, in which a direct mechanical or positive drive connection is provided between the engine and vehicle wheels. In use, the torque drive position is employed for starting the vehicle and for accelerating it up to a certain speed and then the clutch is moved to the direct drive position which is used above said certain speed. Remote control of the clutch on the vehicle is desirable on account of the location of the operator with respect to the power unit on the vehicle.

One object of the invention is therefore the provision of novel means for remotely controlling the positioning of a device such as the clutch just described.

In clutches of the above type the clutch parts are maintained in each of their different positions by spring controlled toggles. In order to shift the clutch to its different positions power must be applied to overcome the toggle springs and shift the toggles past their dead centers. The toggles then complete the shifting operation. It will thus be apparent that after the toggles are shifted over their dead centers it is not only unnecessary to maintain the shifting force on the toggles but it is also objectionable since it will maintain certain parts of the clutch, such as the clutch throw out bearings, under an unnecessary load.

Another object of the invention is therefore the provision of a novel control arrangement for a clutch such as above described embodying means for removing the shifting force on the clutch after it has been moved to one or another of its different positions.

According to the invention the motive power for shifting the clutch comprises an engine having a double acting piston which is operable by fluid under pressure, and another object of the invention is the provision of means for cutting off the supply of fluid under pressure to said engine after shifting of the clutch to one or another of its different positions has been effected so as to thereby prevent unnecessary waste of fluid under pressure by possible leakage through said engine.

Like the clutch, the fluid pressure actuated shifting engine has a neutral position for neutralizing the clutch and at one side thereof a torque drive position and at the opposite side a direct drive position for positioning the clutch in like positions. For neutralizing the clutch the engine has to move from one or the other of the extreme positions to the neutral position, and another object of the invention is the provision of means for positively arresting the shifting engine in its neutral position so as to insure neutralizing of the clutch, when so desired.

It is desirable that the operator of these vehicles know by a signal or other indication that the clutch device is being or has been positioned as desired, and another object of the invention is the provision of novel means for accomplishing this end.

Means for indicating the position of the clutch on these vehicles is especially desirable when the vehicle is of the type provided with two motor units and therefore two clutch devices, or where two or more vehicles are coupled together in a train and are under the control of an operator at the head end of the train. Another object of the invention is therefore the provision of means for indicating to the operator that each and every clutch device on one vehicle or in a train of vehicles are operating or have operated as intended.

Another object of the invention is the provision of a novel clutch control system equally adapted to control one clutch or a plurality of clutches and for insuring that each and every one of the clutches will operate in unison and further embodying means adapted to operate only upon such unified operation for indicating to the operator that all of the clutches on the vehicle or train are operating or have been operated as intended.

A further object of the invention is the provision of an electrically controlled system for a plurality of clutches in which the operation of the several clutch devices and of the signal system for indicating the operation or position of the clutch devices are dependent upon the integrity of electrical circuits controlled through train wires extending from one end of a vehicle or train to the opposite end, so as to thereby insure uniform or simultaneous operation of each and every clutch device on the vehicle or train.

Other objects and advantages will be apparent from the following more detailed description of the invention.

In the accompanying drawing; Fig. 1 is a diagrammatic view of a clutch control system embodying the invention; Fig. 2 is a partial plan view of a manually operated control device shown in diagrammatic, development form in Fig. 1; and Fig. 3 is a diagrammatic view of a modification of the invention shown in Fig. 1.

*Description of Figs. 1 and 3*

As shown in the drawing, the improved clutch control system comprises a clutch shifting engine 1 for each clutch device on a vehicle or train of vehicles, and for each engine 1 there is provided a locking device 2, a torque shifting magnet device 3, a direct shifting magnet device 4, and a locking device control magnet device 5.

On each vehicle there is provided a manually operative control device 6 for controlling the operation of the magnet devices just described, a source of electric current such as a battery 7, and a clutch position indicating means such as an incandescent lamp 8.

Each vehicle is also provided with the following train wires which are adapted to extend from one end of the vehicle to the opposite end for connection by suitable connectors to corresponding wires on connected vehicles of a train. These wires include a B+ train wire 9 connected with the positive side of battery 7, a B— train wire 10 connected to the negative side of battery 7, a signal train wire 11 for the signal lamp 8, three train wires 12, 13 and 14 to which the magnet devices 3, 4 and 5, respectively, are connected and over which they are adapted to be controlled, and a B+ return wire 15 over which current is adapted to be supplied for controlling operation of the magnet devices 3 and 4 from the manually operated control device 6. At the end of the train or of one vehicle in case it is being operated by itself, the B+ wire 9 is adapted to be connected to the B+ return wire 15 by a jumper 16 and to the signal wire 11 by a jumper 17 whereby operation of the shifting magnets 3 and 4 and of the indicating lamp 8 are dependent upon the integrity of these train wires.

Reference numeral 20 indicates a portion of the housing of a clutch, such as above described, while the reference numeral 21 indicates a rock shaft which is suitably connected to said clutch for actuating same, and which is adapted to be operated by an arm 22 to one end of which it is connected.

The clutch, as hereinbefore described, has a neutral position for breaking the drive connection between the motor unit on the vehicle and the drive wheels thereof, and at one side of said neutral position a torque drive position for connecting the motor unit to the vehicle drive wheels through a hydraulic power transmitting device. At the opposite side of neutral position the clutch has a direct drive position for connecting the motor unit directly to the drive wheels of the vehicle.

When the arm 22 occupies the position shown, the clutch controlled thereby through rock shaft 21 is adapted to be in neutral position. This arm is adapted to be turned in a clockwise direction to a torque drive position, indicated by a line 23, for moving the clutch to its torque drive position. The arm 22 is also adapted to be turned in the opposite direction from the neutral position shown to a direct drive position, indicated by a line 24, for moving the clutch device to its direct drive position. Movement of the arm 22 from either of its drive positions to its central, neutral position is adapted to move the clutch controlled thereby to its neutral or non-driving position.

The shifting engine 1 is provided for effecting movement of the arm 22 to its different positions to thereby control the position of the clutch controlled by said arm. The shifting engine comprises a casing 26 containing two movable abutments 27 and 28, preferably in the form of pistons, which are spaced apart and rigidly connected together by a stem 29. This stem intermediate its ends is provided with a lug 30 projecting outwardly therefrom at right angles to its axis. The end of arm 22 opposite that connected to the rock shaft 21 is bifurcated and straddles the lug 30 so as to be movable with the pistons 27 and 28.

Between the pistons 27 and 28 is a chamber 31 which is in constant communication with the atmosphere through a slot 32 in which the arm 22 is adapted to operate. At the opposite face of piston 27 is a pressure chamber 33 adapted to be either supplied with fluid under pressure or open to the atmosphere in accordance with operation of the magnet device 3, as will be hereinafter described. At the opposite face of piston 28 is a pressure chamber 35 adapted to either be supplied with fluid under pressure to open to the atmosphere in accordance with operation of the magnet device 4, as will be later described.

Only one of the chambers 33 and 35 is adapted to be supplied with fluid under pressure at one time, the other chamber being vented. If chamber 33 is supplied with fluid under pressure, said pressure acting on the piston 27 will move said piston and thereby the piston 28 in the direction of the right hand to a position defined by contact with a resilient bumper 36, and as will be apparent, this movement will turn the operating arm 22 from the position shown to the torque drive position indicated by line 23 for thereby moving the clutch to its torque drive position. If chamber 35 is supplied with fluid under pressure, the piston 28 will be moved in the direction of the left-hand to a position defined by contact with a resilient bumper 37, and this operation will turn the arm 22 to the direct drive position indicated by the line 24 for thereby positioning the clutch in its direct drive position.

As before mentioned, the shifting engine is adapted to move spring controlled toggles associated with the clutch past their dead center positions after which further movement of the clutch to its desired position is effected by such toggles. It will therefore be apparent that after sufficient movement of pistons 27 and 28 in either one direction or the other to shift the toggles past their dead centers the force opposing such movement will be suddenly released so that further movement of the pistons will be substantially unopposed and tend to be very rapid. The bumpers 36 and 37 are provided to absorb the inertia of the pistons 27 and 28 at the end of their stroke in either direction of movement to thereby prevent damaging the shifting engine.

Movement of the arm 22 from either of its extreme positions to its neutral position shown is adapted to be effected by the action of fluid pressure in either chamber 33 or 35, and to prevent such pressure moving the pistons and thereby the arm 22 past the neutral position, or in other words to positively arrest said pistons and thereby the arm 22 in the clutch neutralizing position shown, the locking device 2 is provided.

The locking device 2 comprises a casing associated with the engine casing 26 and containing a piston 40 having at one side a pressure chamber 41 and at the opposite side a non-pressure chamber 42 which is open to the atmosphere through a breather port 43. Projecting from piston 40 through the pressure chamber 41 and a leak tight bearing in the end wall thereof is a rod 45 carrying in its lower end a roller 46. This roller is disposed over the edge of a rib 47 extending between and connected at opposite ends to the pistons 27 and 28 at one side of the piston rod 29. Midway between the pistons the rib 47 is provided with a notch 48 adapted to receive the roller 46 when the pistons and the clutch operating arm 22 are in their neutral positions shown. A spring 49 in the non-pressure chamber 42 acts on the piston 40 for urging the roller 46 against the rib 47 to secure the pistons against movement when said roller is disposed in the notch 48. When fluid under pressure is supplied to the pressure chamber 41, as will be later described, such pressure acting on the piston 40 is adapted to move said piston upwardly against spring 49 to thereby withdraw the roller 46 from the notch 48 so as to free the pistons 27 and 28 for movement.

Projecting from the upper face of piston 40 is a switch operating shaft 50 carrying at its upper end, outside of the locking device, a movable contact 51 which is provided for making and breaking electric circuits through the signal train wire 11 and the B+ return train wire 15. When the roller 46 is in the notch 48 the contact 51 is adapted to break the circuit through the B+ return wire 15 and close the circuit through signal train wire 11. When the piston 40 is operated to raise the roller 46 out of the notch 48 the contact 51 is adapted to break the circuit through the signal train wire 11 and to make the circuit through the B+ return wire 15.

The magnet devices 3, 4 and 5 are all of identical construction, each comprising a magnet 55 which is arranged to control two oppositely disposed valves 56 and 57 contained in chambers 58 and 59, respectively, and having coaxially arranged fluted stems projecting from their adjacent faces and engaging each other in a chamber 60. The chamber 58 in each of the magnet devices is open to the atmosphere through a port 61 while the chamber 59 is supplied with fluid under pressure from any suitable source such as a supply reservoir 62 by way of a pipe 63. A spring 64 is provided in chamber 59 in each of the magnet devices for seating valve 57 and unseating valve 56 when the magnet 55 is deenergized so as to thereby close communication between chambers 59 and 60 and open chamber 60 to chamber 58 and thereby to the atmosphere through the port 61. Energization of magnet 55 is adapted to seat the valve 56 and unseat the valve 57 against the opposing force of spring 64 to thereby close communication between chambers 58 and 60 and open the latter to chamber 59.

In the torque shifting magnet device 3 the chamber 60 is open through a pipe 65 to pressure chamber 33 in the shifting engine 1. In this pipe is a check valve device 66 and a choke or restriction 67 by-passing said device, the check valve device being provided to permit relatively rapid flow of fluid under pressure to chamber 33 in the engine, while choke 67 is provided to restrict the flow of fluid under pressure away from chamber 33 to a desired relatively slow rate.

Chamber 60 in the direct shifting magnet device 4 is connected by a pipe 68 to the pressure chamber 35 in the shifting engine 1 and in this pipe are disposed a check valve 69 and a choke 70 by-passing same for the same purpose as the check valve 66 and choke 67 in pipe 65.

Chamber 60 in the locking magnet device 5 is connected by a pipe 71 to pressure chamber 41 in the locking device 2 associated with the shifting engine 1.

One terminal of each of the magnets 55 of the magnet devices 3, 4 and 5 is connected to the B— train wire 10 which as before mentioned is connected with the negative side of battery 7. The other terminal of the magnets of the magnet devices 3, 4 and 5 are connected to train wires 12, 13 and 14, respectively. It will be apparent that in case there are several shifting engines 1, as on a train, the several sets of magnet devices 3, 4, and 5 will be connected in parallel to their respective train wires.

The manually operative control device 6 is provided for controlling circuits through train wires 12, 13 and 14 to control operation of the magnet devices 3, 4 and 5 and to this end comprises a movable drum 75 carrying a plurality of independent contacts 76 to 81 adapted to be moved relative to and so arranged as to cooperate with a plurality of fixed contacts 82 to 87, for providing a desired control of the several magnet devices connected to the train wires 12 to 14, in different positions of said drum with respect to said fixed contacts, as will be later brought out.

The drum 6 is adapted to be moved relative to the fixed contacts 82 to 87 to six diffeernt positions arranged in the order shown in both Figs. 1 and 2 and bearing the following legends. Torque shifting position for causing movement of the clutch on the one or more vehicles to torque drive position. Torque running position adapted to be used while the vehicle is running with the clutch in the torque drive position and in which no energy is being consumed either in the form of electric current or fluid under pressure. A next position indicated as torque to neutral which is employed for moving the clutch from its torque drive position to its neutral position and in which no energy is consumed after completion of such movement. The next position in order is direct to neutral adapted to be employed for moving the clutch from the direct drive position to its neutral position. The next position is direct running for use when the vehicle is running after the clutch has been shifted to direct drive position, and the final position is direct shifting for use in shifting the clutch to the direct drive position. In both the direct to neutral position and the direct running position no energy is consumed, the same as in the torque to neutral and torque running positions.

In Fig. 1 the drum 75 is shown in the torque to neutral position with respect to the fixed contacts 82 to 87. The disposition of the several contacts 76 to 81 on the drum with respect to the fixed contacts 82 to 87 for the different positions of said drum will be brought out in the description of operation to follow.

The fixed contacts 85, 87 and 83 are connected, respectively, to the train wires 12 to 14. The fixed contact 82 is connected to the B+ train wire 9 and in this connection is a cut out switch 93 adapted to be closed only at the operator's station. The fixed contacts 84 and 86 are both connected to the B+ return train wire 15 and in this connection is a cut out switch 90 adapted to be closed only at the operator's control station and to be opened at all other points in the train, A cutout switch 92 is provided between the B+ train wire 9 and battery 7 and is adapted to be closed only on the control vehicle of the train. The indicating lamp 8 is connected across the signal train wire 11 and the B— train wire 10 and cutout switch 91 is arranged in this connection for cutting said lamp out of operation on all cars of a train except the control unit, if such is desired.

Now referring to the plan view of the manually operated control device 6 shown in Fig. 2. The numeral 95 indicates the casing of the device in which is journalled a shaft 96 which is adapted to be connected with the drum 75 and to which is connected an operating handle 97 for turning said drum to its different positions above mentioned.

The casing 95 is provided with a quadrant 98 over which the handle 97 is adapted to be moved to its different positions and said handle is provided with a spring actuated detent 99 adapted to move on the edge of said quadrant. The quadrant 98 has four notches numbered 100 to 103 adapted to receive the detent 99 for defining, respectively, the torque running position, the torque to neutral position, the direct to neutral position, and direct running position.

The handle 97 is adapted to be moved beyond the notch 100 to the torque shifting position which is defined by contact between said handle and a wall 104 provided at one end of the quadrant. In the torque running position the handle 97 is adapted to contact the head of a spring pressed plunger 105 provided to oppose movement from said position to torque shifting position and which is adapted to operate upon the release of manual pressure from the handle to move said handle and thereby the connected drum 75 back to torque running position. A like shoulder 106 is provided at the opposite end of the quadrant and a similar plunger 107 which is adapted to oppose manual movement of the handle 97 from direct running position to direct shifting position and which upon release of manual pressure on the handle is adapted to automatically return the handle from direct shifting position to direct running position.

*Operation, Figs. 1 and 2*

Let it be assumed that a vehicle equipped with this improved clutch control mechanism is at rest and that the manual control handle 97 at the operator's station is in the torque to neutral position as shown. As a consequence the parts of the shifting engine 1 and of the clutch controlled thereby will be in their neutral position disconnecting the motor unit from the drive wheels of the vehicle, as will be apparent from the description to follow.

Let it further be assumed that the several cutout switches 90 and 93 are closed and that the jumpers 16 and 17 are in position connecting the rear ends of train wires 9, 15 and 11.

With the operating handle 97 in the position shown no current is supplied to the train wire 14 so that at the engine 1 the magnet 55 of the locking magnet device 5 will be deenergized and the valve 56 therein unseated thus opening piston chamber 41 in the locking device to the atmosphere. Spring 49 will therefore be effective to maintain the roller 46 in notch 48 so as to hold the shifting pistons 27 and 28 and thereby the clutch operating arm 22 in the position shown neutralizing the clutch controlled thereby.

With the locking piston 40 in its lower position the switch 51 connected thereto is also in its lower position breaking the circuit through the B+ return train wire 15 and closing the circuit through the signal train wire 11, so as to thereby supply current to the signal lamp 8 at the operator's station to notify the operator that the clutch is in its neutral position.

With the switch 51 in its lower position, the circuit between the B+ return wire 15 and the cutout switch 90 is broken so that no current is supplied to the contacts 84 and 86 in the manually operated control device 6. No current is supplied to contact 85 in the manually operated control device when in torque to neutral position, so that in said position the train wires 12 and 13 will both be deenergized and likewise the magnet devices 3 and 4. As a result, both piston chambers 33 and 35 in the shifting engine 1 will be open to the atmosphere so that the parts of said engine will remain in the clutch neutralizing position shown.

Let it be further assumed that the fluid pressure supply reservoir 62 is charged with fluid under pressure in any desired manner.

If the operator now desires to start the vehicle he moves the handle 97 and thereby the drum 75 from torque to neutral position to torque shifting position. He holds the handle in torque shifting position for two or three seconds after which he releases same and the spring pressed plunger 105 automatically moves it to torque running position.

When the handle is moved to torque shifting position the stationary contact 82 connected to the B+ train wire 9 is connected by contact 77 on the drum 75 to the stationary contact 83 so that current is supplied from the train wire 9 to the locking magnet device 5 for energizing same to seat the valve 56 and unseat the valve 57. With valve 57 of the magnet device 5 unseated fluid under pressure is supplied from reservoir 62 through pipe 63 to pipe 71 and thence to pressure chamber 41 in the locking device 2. This pressure acting on the locking piston 40 effects movement thereof in an upwardly direction against the opposing pressure of spring 49 and this movement raises the roller 46 out of the notch 48 and also moves the contact 51 to its upper position thereby breaking the circuit to the signal lamp 8 and connecting the B+ return train wire 15 to the fixed contacts 84 and 86 in the manually operated control device 6.

In torque shifting position of handle 97 the contact 78 carried by the drum 75 bridges the fixed contacts 84 and 85 so that current supplied to the contact 84 is supplied to the train wire 12 and thence to the torque shifting magnet device 3 for energizing same to seat the valve 56 and unseat the valve 57 therein. With valve 57 in the torque shifting magnet device 3 unseated fluid under pressure is supplied from reservoir 62 through pipe 63 to pipe 65 and flows to piston chamber 33 in the shifting engine at a relatively rapid rate through the check valve device 66 in the pipe 65.

With the roller 46 disengaged from notch 48, the pressure of fluid obtained in chamber 33 acting on piston 27 effects movement of said piston in the direction of the right hand until the piston 28 engages the cushion 36 and this movement turns the shifting arm 22 from the neutral position shown to the torque drive position indicated by the line 23 for thereby shifting the clutch controlled by said arm from its neutral position to its torque drive position. The clutch controlled by the engine is thereby operated to connect the motor unit on the vehicle to the drive wheels thereof through the hydraulic drive device hereinbefore mentioned and through this connection power is adapted to be applied to the drive wheels of the vehicle for starting the vehicle and for accelerating same up to a certain desired speed.

It is necessary that the handle 97 be held in torque shifting position only for a period of time sufficient for chamber 33 in the shifting engine to become charged with fluid at a pressure sufficient for shifting the clutch to the torque drive position above described. This time period, as above mentioned, may be only two or three seconds.

When the handle 97 is automatically returned to torque running position, all electrical connections in the manually operated control device 6 are broken as a result of which both the locking magnet device 5 and torque shifting magnet device 3 become deenergized while the direct drive shifting magnet device 4 remains deenergized.

Upon deenergization of the torque shifting magnet device 3 the valve 57 therein is seated and the valve 56 unseated thereby opening communication between chamber 33 in the shifting engine and the atmosphere through the vent port 61 for releasing fluid under pressure from said chamber. This release of fluid under pressure from chamber 33 is restricted by the choke 67, the purpose of which is to maintain a sufficient pressure on the piston 27 to insure full movement thereof to its right-hand position in case the handle 97 is not held in torque shifting position until after this movement is completed.

With the locking magnet device 5 deenergized the fluid under pressure is vented from chamber 41 below the locking piston 40 which permits spring 49 to urge the roller 46 against the top edge of rib 47. The rib 47 engaging the roller 46 is however adapted to act through rod 45, piston 40, and shaft 50 to maintain the contact 51 in its upper position connecting the train wire 15 to the contacts 84 and 86 on the drum 75.

It will be noted that in starting the vehicle electrical energy from the battery 7 is used only as long as the handle 97 remains in torque shifting position. Also fluid under pressure is supplied to chamber 33 in the engine only in the torque shifting position and the amount of fluid under pressure consumed by the engine is limited substantially to the displacement of the piston 27 in moving from its neutral position to the right-hand torque drive position above mentioned. Thus there can be no material waste of fluid under pressure due for instance to leakage past the piston 27. Further, since the fluid pressure supplied to chamber 33 is vented after the clutch has been shifted to a desired position the clutch operating arm 22 is relieved of the shifting force so that the shifting bearings or other parts of the clutch are not unnecessarily loaded after completion of the shifting operation.

If it is desired to run the vehicle at a speed exceeding a certain rate then when such rate is obtained the operating handle 97 is moved from torque running position over to direct shifting position in contact with shoulder 106. The handle is held manually in direct shifting position for two or three seconds and then released. The spring pressed plunger 107 then moves the handle to direct running position.

In direct shifting position current is supplied through from the B+ train wire 9 to train wire 14 by way of the contacts 82 and 83 which are bridged by the drum contact 80. The locking magnet device 5 is as a consequence energized and operates to supply fluid under pressure to piston chamber 41 in the locking device 2 to thereby hold the piston 40 and switch 54 in their upper position for supplying electric current to the contacts 84 and 86 in the manually operated control device 6. In direct shifting position of the manually operated control device the contact 81 on drum 75 bridges the contacts 86 and 87 so that current supplied to the contact 86 is supplied to train wire 13 and thence to the direct shifting magnet device 4 for effecting energization thereof to seat the valve 56 and unseat the valve 57. With the valve 57 in device 4 unseated fluid under pressure is supplied from the reservoir 62 through pipe 63 to pipe 68 leading to piston chamber 35 in the shifting engine 1, this supply being by way of check valve device 69, in pipe 68. The pressure of fluid obtained in chamber 35 acting on the piston 28 is adapted to move said piston and thereby the piston 27 from their extreme right-hand position to their extreme left-hand position defined by engagement between the piston 27 and the cushion 37 and this movement is adapted to operate the arm 22 from its torque drive position indicated by line 23 to its direct drive position indicated by line 24 for thereby shifting the clutch controlled by said arm from its torque drive position through its neutral position to its direct drive position in which the motor unit on the vehicle is connected directly to the drive wheels thereof for driving the vehicle above the certain speed above mentioned.

It will be noted that the supply of fluid under pressure from the locking magnet device 5 to piston chamber 41 in the locking device 2 upon movement of the handle 97 to direct shifting position serves no useful function when the pistons 27 and 28 are in their extreme right-hand position since in this position the roller 46 is in contact with the top of rib 47 which holds the switch 51 in its upper position. The purpose of supplying fluid under pressure to the chamber 41 at this time however is to maintain the piston 41 and thereby the roller 46 in their elevated positions as the pistons 27 and 28 move through neutral position, or in other words to prevent the roller 46 being forced into the notch 48 as said pistons move through neutral position to their extreme left-hand position. Thus the engine pistons are adapted to freely move from their extreme right-hand or torque drive position to their extreme left-hand or direct drive position when it is intended to shift the clutch directly from its torque drive position to its direct drive position.

When the handle 97 is automatically returned from direct shifting position to direct running position all of the train wires become deenergized and as a result the locking magnet device 5 and the direct shifting magnet device 4 become deenergized for releasing fluid under pressure from the piston chambers 41 and 35 respectively, the release of fluid under pressure from the latter chamber being restricted by the choke 70 for the same reason as the release of fluid under pressure was restricted from chamber 33 by choke 67 above described. Thus with the parts of the shifting engine in the extreme left-hand position the shifting arm 22 and thereby the throw out bearing of the clutch controlled thereby are relieved of shifting force, as will be apparent.

In shifting the clutch to its direct drive position it will also be noted that electric current is only used momentarily while in direct shifting position of handle 97 and that the amount of fluid pressure used is limited to merely the displacement of the piston 28.

When it is desired to stop the vehicle with the clutch in the direct drive position the handle 97 is moved from direct running position to direct to neutral position, in which electrical energy supplied to the contact 84 in the manually operated control device by way of the switch 51 is supplied through the contact 79 on the drum 75 to contact 85 and thence to the torque shifting magnet device 3 for effecting energization thereof to supply fluid under pressure to piston chamber 33. It will be noted that in this position of the handle 97 the locking magnet device 5 remains deenergized so that piston chamber 41 in the locking device 2 associated with the shifting engine remains open to the atmosphere. As a result, spring 49 acting on the piston 40 is effective to urge the roller 46 downwardly against the top of the rib 47.

The fluid pressure obtained in chamber 33 acts on piston 27 to effect movement in the direction of the right-hand, and this movement continues until the notch 48 in the upper edge of the rib 47 becomes aligned with the roller 46 at which time spring 49 forces said roller into said notch so as to thereby arrest the pistons 27 and 28 in their neutral position for in turn neutralizing the clutch on the vehicle.

When the roller 46 drops into notch 48 as just described the contact 51 is moved to its lower position to cut off the supply of current to the contact 84 in the manually operated control device 6 for effecting deenergization of the magnet device 3 and consequent venting of fluid under pressure from the piston chamber 33 in the engine. Thus as soon as the engine obtains neutral position the supply of current to the operating magnet device 3 is cut off and the actuating pressure on the shifting engine is relieved automatically without any attention on the part of the operator so as not only to minimize the consumption of energy but also to relieve the clutch of unnecessary load.

When the switch contact 51 returns to its lower position, the signal light 8 is lighted to indicate the desired neutralization of the clutch to the operator.

If it is desired to stop the vehicle when operating at a speed at which the handle 97 would be in torque running position, said handle is moved from said position to torque to neutral position. In this latter position the drum contact 76 connects the energized contact 86 to contact 87 to thus supply electrical energy from the B+ return wire 15 to the train wire 13 and thence to the direct shifting magnet device 4, the locking magnet device 5 remaining deenergized in this position the same as in direct to neutral position. Energization of the direct shifting magnet device 4 acts to supply fluid under pressure to piston chamber 35 in the shifting engine for effecting movement of the pistons 28 and 27 in the direction of the left-hand. This movement continues until the notch 48 in rib 47 becomes aligned with the roller 46 at which time said roller enters said notch and arrests the pistons and thereby the clutch controlled by the engine in neutral position. When the roller 46 is thus dropped into the notch 48 the contact 51 is moved to its lower position for closing the circuit through the signal lamp 8 and for opening the circuit through the direct shifting magnet device 4 which becomes deenergized and vents the fluid under pressure from piston chamber 35 in the engine.

The above description has been confined to one vehicle having one propulsion motor and therefore one clutch. As before mentioned however, some vehicles are provided with more than one propulsion motor and a clutch is used for each motor. Moreover these vehicles are at times operated in trains under which condition there will be several propulsion motors and clutches.

Under both of the above conditions it is desired that all of the clutches be controlled from one operator's station and operate in unison. It is further desired that the operator be appraised of the integrity of the control circuits and also of the operating condition of the plurality of clutch shifting engines. These results are attained as follows:

On a vehicle provided for instance with two propulsion motors, two clutches and therefore two shifting engines 1 and two sets of magnet devices 3, 4 and 5, the magnet devices in both sets will be connected in parallel across the respective train wires, as hereinbefore mentioned. By this arrangement the several engines 1 and clutches controlled thereby will operate in unison in response to operation of the one manual control device 6 on the vehicle.

Where there are two engines 1 on a vehicle there will also be two switches 51 and, as shown in Fig. 1, these switches will control in series the circuit to lamp 8 and the supply of electric current through the B+ return train wire 15 to the manual control device 6 by way of the cut out switch 93. By this arrangement the lamp 8 will light only when both engines 1 are in neutral position and when the train wires 9 and 11 are unbroken and are properly connected at the rear end of the vehicle by jumpers 16 and 17. Further, the lock devices 2 on both engines must respond to operation of the manual control device 6 to move the switches 51 to the upper position in order to obtain current over the B+ return wire 15 to the manual control device 6 for causing shifting of the clutches.

With these arrangements operating as described, the operator at the control station will be assured that the clutches under his control are uniformly operating in the manner required.

The above description also applies to a train of vehicles since the magnet devices 3, 4 and 5 on the different vehicles will be connected in parallel across their respective train wires; the jumpers 16 and 17 will need be in place at the rear end of the train and the several switch devices 51 on the different vehicles will all have to function properly to provide the required control of the circuit to lamp 8 and through the B+ return wire to the manual control device 6 at the operator's station at the leading end of the train.

On all vehicles of a train except the leading vehicle, the cutout switches 92, 90 and 93 will be open so that on these vehicles the battery 7 will be disconnected from the B— train wire 9 and the manual control device 6 will be cut out. The cut out switch 91 on these vehicles may also be opened if desired since the lamp 8 only at the operator's station need function.

From the above description it will be apparent that regardless of the number of clutch shifting engines 1 being controlled from the manual control device 6, the failure of lamp 8 to light when intended will indicate a defect somewhere in the system. If the lamp 8 lights but fails to go out when required a defect in the system is indicated. If the lamp goes out when intended it will indicate proper operation of the switch 51 at a shifting engine. In case of several shifting engines the lamp 8 can be extinguished by the operation of switch 51 at only one engine but the locking device 2 at all engines must work as intended to obtain current at the manual control device 6 for effecting operation of the engines. A failure of such supply will prevent operation of all clutches. By these arrangements the operator will therefore be appraised by the operating condition of the system so that proper conditioning of the system may be assured.

Description—Fig. 3

In the embodiment of the invention above described signal lamp 8 is adapted to be lighted only when the shifting engine or engines 1 are in their neutral positions neutralizing the clutch or clutches controlled thereby. The lighting of lamp 8 also indicates the integrity of the lighting circuit including the train wires 9 and 11 and jumpers 16 and 17 at the rear end of the vehicle or train of vehicles.

It might be desirable however to provide a signal which would positively indicate all positions of the shifting engine or engines and thereby of the clutches controlled by the engines. To this end I have provided the arrangement shown in Fig. 3 which embodies a lamp 110 adapted to be lighted when the clutch engine or engines under the control of the manually operated control device 6 are in torque drive position, and another signal lamp 111 adapted to be lighted when the clutch or clutches are in direct drive position, both lamps however being adapted to be extinguished when the shifting engine or engines are in their neutral position.

According to this modification the signal train wire 11, jumper 17, and contact below the shifting engine switch 51 in the embodiment of the invention shown in Fig. 1 are dispensed with. I however add to the equipment two train wires 112 and 113. A jumper 114 is provided for connecting these train wires at the rear of the vehicle or train of vehicles and another jumper 115 is provided for connecting the train wire 15 to the train wires 112 and 113.

The light 110 is connected across the train wires 112 and 10 while the light 111 is connected across the train wires 113 and 10 with suitable cut out switches 116 and 117 in such connections for cutting out said lamps on all vehicles except the control vehicle, if such is desired.

The circuit through the train wire 112 is arranged to be controlled by a self-opening switch device 118 disposed at one side of the clutch operating arm 22 so as to be closed by said arm upon movement thereof to the torque drive position indicated by the line 23. At the opposite side of the arm 22 is a similar switch device 119 arranged to control the circuit through the train wire 113 and adapted to be operated by said arm to close said circuit when said arm is moved to the direct drive position indicated by the line 24.

Operation—Fig. 3

In operation, both of the lights 110 and 111 will be extinguished when a shifting engine 1 is in neutral position due to the fact that both of the switches 118 and 119 will be opened. However, when the engine 1 is moved to its torque drive position, the switch 118 will be closed so as to supply energy to the light 110 for lighting same to thereby indicate to the operator the desired position of the engine. When the engine is moved to its opposite or direct drive position, the switch 119 will be closed and the lamp 111 lighted so as to indicate to the operator that the engine has operated as intended. In the case of a multiple of shifting engines 1 as on a train of connected vehicles, the lighting of lamp 110 or of lamp 111 will indicate that all of the engines have moved to the desired position since the lighting circuit for each of these lamps is controlled serially through the switches 118 and 119, respectively, on the several vehicles. The failure of any engine to operate as intended will therefore be immediately brought to the attention of the operator.

Summary

From the above description it will now be apparent that the improved mechanism is particularly adapted for remote control of either one or a multiple of multi-position devices such as a three position engine 1 and clutch controlled thereby. The system is relatively simple in construction and its operation requires no special training or judgment on the part of an operator. The operator merely has to move the control handle 97 to a position calling for a desired operation and such operation will automatically occur without further attention on the operator's part. Either of the signal or indicating systems above described will provide to the operator an indication of the desired functioning or failure of the device or devices under his control.

It will be apparent that the arrangement is particularly adapted to provide uniform operation of several remote devices. Of importance is the relatively simple means for insuring neutralizing of the engine and thereby of the clutch when desired. This means as will be apparent is simple in construction and positive in operation and provides a simple means for control of the lamp indicating circuit in Fig. 1 as well as of the current supply for causing operation of the shifting magnet devices 3 and 4 whereby such supply may be cut off upon neutralization of the shifting engine. This current cut off is independent of the manual control device 6 and thus precludes the need for an additional position or positions in said device to perform this function. The manually operated control device 6 is simplified in this respect, and in addition the spring actuated detents 105 and 107 provide a simple, effective and convenient means for automatically terminating the supply of electric current to the locking magnet device 5 and to the shifting magnets 3 and 4 in the different shifting positions without any attention on the part of the operator.

Of importance is the fact that the consumption of energy, both electrical and in the form of compressed air, is reduced to a minimum in that, except for the signal lamps, energy is only employed momentarily for effecting a desired operation and then cut off. In the embodiment shown in Fig. 1 the lamp 8 uses energy as long as the shifting engine or engines are in their neutral position as will be apparent, but the amount which will be consumed thereby will be negligible. The amount of energy consumed by the lamps 110 and 111 in the embodiment shown in Fig. 3 will also be negligible since only one of these lamps is lighted at one time and only then when the clutch shifting engine is in a certain position.

Also of importance is the fact that the improved arrangement provides for automatic release of fluid under pressure from the shifting engine after a shifting operation has been completed so as to avoid waste of fluid under pressure by possible leakage through the engine and also to avoid imposing an unnecessary load on the bearings or other parts of the clutch at this time.

While only one illustrative embodiment of the invention and a modification thereof has been shown and described in detail it is not the intention to limit the scope to that embodiment or otherwise than by the terms of the appended claims.

Having now described my invention, what I claims as new and desire to secure by Letters Patent, is:

1. A power control mechanism, comprising, power means having two operating positions and being movable by a differential in fluid pressures in two chambers to one of said two positions and upon a reversal of said differential to the other of said two positions, locking means operative to lock said power means in the said other of said two positions, and manually operated means movable to one position for releasing said locking means from said power means and cooperative with said locking means only upon release thereof to create said differential of fluid pressures, said manually operated means being movable to another position for cooperating with said locking means to effect said reversal of differential, said locking means being operative automatically to destroy the differential of fluid pressures on said power means in the second named position of said power means, said manually operated means having a third position intermediate the two above named positions for destroying the differential in pressures on said power means, and means operative automatically upon release of manual pressure on said manually operated means in the first named position to move same to said third position.

2. A power control mechanism, comprising, power means having two positions and being movable from one of said positions to the other upon creation of a differential of fluid pressures in two chambers and being movable from the second named position to the first named position upon a reversal in said differential of fluid pressures, locking means having a locking position for cooperation with said power means in its first named position for securing same against movement and being movable to a release position for freeing said power means for movement, and means movable by manual force to one position for effecting movement of said locking means to its release position and cooperative therewith in its release position to create said differential in fluid pressures in said chambers, said manually operable means having a second position for cooperation with said locking means in its release position to effect said reversal of differential and for rendering said locking means effective upon return of said power means to its first named position, said manually operative means having a third position intermediate the two above named positions for destroying the differential in fluid pressures in said chambers, and spring means arranged to move said manually operable means from its first named position to its last named position upon release of manual pressure on said manually operable means.

3. A power control mechanism, comprising, movable abutment means having two end positions and an intermediate position and controlled by the differential of fluid pressures in two chambers and being movable in the direction of one of said end positions upon creation of a certain differential in pressures in said chambers and in the direction of the other end position upon a reversal in the differential of pressures in said two chambers, locking means associated with said movable abutment means and adapted to cooperate therewith in the said intermediate position thereof for securing same against movement and being movable to a release position for releasing said movable abutment means for movement, and manually operable means having one position for effecting operation of said locking means to its release position and having another position for releasing said locking means for movement from its release position, said locking means cooperating with said manually operable means in its first named position for creating said differential in fluid pressures and in the second named position of said manually operable means for creating said reversal of differential in fluid pressures, said manually operable means having a third position for destroying the differential in fluid pressures in said chambers, and spring means arranged to oppose movement of said manually operable means to its first named position and operable automatically upon release of manual force on said manually operable means to move same from said first named position to its last named position.

4. A power control mechanism, comprising, movable abutment means having a neutral position and being movable therefrom to one operating position upon creation of a differential in fluid pressures in two chambers and being movable in the opposite direction from said neutral position to another operating position upon a reversal of said differential in fluid pressures, locking means arranged to cooperate with said movable abutment means in said neutral position for securing same against movement, said locking means being movable to a release position for freeing said movable abutment means for movement and being maintained in said release position by said movable abutment means when out of said neutral position, and a manually operable control device having a plurality of operating positions arranged in the following order for controlling the positioning of said movable abutment means, a first position for releasing said locking means from said movable abutment means and for cooperating with said locking means in its release position to create said differential in fluid pressures on said abutment means, a second position for destroying said differential in fluid pressures on said abutment means, a third position for creating said reversal of differential in fluid pressures on said abutment means and for rendering said locking means effective to lock said abutment means in said neutral position, a fourth position for establishing said differential of fluid pressures on said abutment means and for rendering said locking means effective to lock said abutment means in said neutral position, a fifth position for destroying said differential in fluid pressures on said abutment means, and a sixth position for creating said reversal of differential in fluid pressures on said abutment means and for effecting movement of said locking means to its release position.

5. A power control mechanism, comprising, movable abutment means having a neutral position and being movable therefrom to one operating position upon creation of a differential in fluid pressures in two chambers and being movable in the opposite direction from said neutral position to another operating position upon a reversal of said differential in fluid pressures, locking means arranged to cooperate with said movable abutment means in said neutral position for securing same against movement, said locking means being movable to a release position for freeing said movable abutment means for movement and being maintained in said release position by said movable abutment means when out of said neutral position, and a manually operable control device having a plurality of operating positions arranged in the following order for controlling the positioning of said movable abutment means, a first position for releasing said locking means from said movable abutment means and for cooperating with said locking means in its release position to create said differential in fluid pressures on said abutment means, a second position for destroying said differential in fluid pressures on said abutment means, a third position for creating said reversal of differential in fluid pressures on said abutment means and for rendering said locking means effective to lock said abutment means in said neutral position, a fourth position for establishing said differential of fluid pressures on said abutment means and for rendering said locking means effective to lock said abutment means in said neutral position, a fifth position for destroying said differential in fluid pressures on said abutment means, and a sixth position for creating said reversal of differential in fluid pressures on said abutment means and for effecting movement of said locking means to its release position, and resilient means arranged to automatically move said control means from said first position to said second position and from said sixth position to said fifth position upon release of manual pressure thereon.

6. A control mechanism, comprising, movable abutment means controlled by the differential in fluid pressures in two chambers and having a neutral position and being movable therefrom in one direction to one operating position upon establishing a certain differential in pressures in said chambers and in the opposite direction to another operating position upon establishing a reversal of said differential in fluid pressures, a locking device arranged to cooperate with said movable abutment means only in the neutral position thereof for securing same against movement and movable to a release position for freeing said movable abutment means for movement, said movable abutment means in all positions except said neutral position being operative to maintain said locking device in said release position, actuating means for moving said locking device into locking relation with said movable abutment means, and a manually operable device having one position for effecting movement of said locking device to its release position and for establishing said differential in fluid pressures on said abutment means, said manually operable device having a second position for equalizing the fluid pressures in said chambers, and a third position for creating said reversal in differential in fluid pressures and for rendering said actuating means effective, and means associated with said locking device for cooperating with said manually operable device in the first and third named positions thereof with said locking device in its release position to establish the said differential or reversal of differential in fluid pressures on said movable abutment means, the last named means being operable upon movement of said abutment means to said neutral position with said manually operable device in its last named position to effect equalization of the fluid pressures in said chambers.

7. A power control mechanism, comprising, movable abutment means having a neutral position and being movable therefrom in one direction to one operating position upon the creation of a certain differential in fluid pressures on said abutment means and in the opposite direction to another operating position upon reversal of said differential of fluid pressures on said abutment means, a locking element arranged to cooperate with said abutment means in the neutral position thereof for securing same against movement, a spring for actuating said locking element, and means operative to move said locking element out of interlocking relation with said abutment means to a release position, said abutment means when out of said neutral position being operative to maintain said locking means in said release position, electroresponsive means operative at one time to effect said differential in fluid pressures on said abutment means and at another time to effect said reversal of differential in fluid pressures on said abutment means, and a manually operative device for controlling said electroresponsive means and locking element and having one position for effecting movement of said locking element to its release position and for effecting operation of said electroresponsive means to establish said differential in fluid pressures, said manually operative device having another position for effecting operation of said electroresponsive means to destroy said differential in fluid pressures and a third position for effecting operation of said electroresponsive means to establish said reversal of differential in fluid pressures, and means associated with said locking element and operative only in the release position thereof to cooperate with said manually operative device in its first and third named positions for effecting the operation of said electroresponsive means.

8. A power control mechanism, comprising, a source of fluid pressure, movable abutment means controlled by the differential in fluid pressures in two chambers and having a neutral position and being movable therefrom upon establishing a certain differential in pressures in said chambers to one operating position at one side of said neutral position and being movable to another operating position at the opposite side of said neutral position upon a reversal of said differential in fluid pressures, locking means arranged to interlock with said abutment means in said neutral position for securing same against movement and movable to a release position for releasing said movable abutment means for movement, said abutment means when out of neutral position being operative to maintain said locking means in its release position, a first magnet device operative upon energization to connect one of said chambers to said source and upon deenergization to open said one chamber to the atmosphere, a second magnet device operative upon energization to connect the other of said chambers to said source and upon deenergization to open same to the atmosphere, and a manually operated switch device movable to one position for effecting movement of said locking means to its release position and for also effecting energization of one of said magnet devices and deenergization of the other, said switch device being movable to another position for effecting deenergization of both of said magnet devices, and to a third position for effecting energization of the second named magnet device and deenergization of the first named magnet device and for also rendering said locking means movable from its release to its locking position, and switch means associated with said locking means and operative in its release position for supplying current to said switch device to control operation of said magnet devices, said switch means being operative to cut off the supply of current to said switch device upon movement of said locking means to its locking position.

9. A power control mechanism, comprising, movable abutment means having a neutral position and controlled by the differential in pressures in two chambers, said abutment means being movable from said neutral position in one direction to one operating position upon supply of fluid under pressure to one of said chambers and the venting of the other, and being movable in the opposite direction from neutral position to another operating position upon supply of fluid under pressure to the said other chamber and the venting of the first named chamber, a magnet device operative upon energization to supply fluid under pressure to the first named chamber and upon deenergization to vent same, a second magnet device operative upon energization to supply fluid under pressure to the second named chamber and upon deenergization to vent same, a spring, locking means operative by said spring to cooperate with said abutment means in said neutral position for securing same against movement and adapted to be operated by fluid under pressure to a release position for releasing said abutment means for movement, said abutment means in all positions except said neutral position being adapted to maintain said locking means in its release position, a third magnet device operative upon energization to supply fluid under pressure to said locking means for effecting movement thereof to its release position and upon deenergization to vent fluid under pressure therefrom, a manually operable switch device, a source of electrical current having a direct connection with said switch device, switch means associated with said locking means and operative in the release position thereof to provide another connection between said source of current and said switch device and operative to break such connection upon movement of said locking means to its locking position, said switch device having one position for connecting said third named magnet device directly to said source of current and the first named magnet device to said switch means to thereby release said locking means from said movable abutment means and to effect movement of said abutment means to one of its operating positions, said manually operative switch device having a second position for cutting off the supply of current to all of said magnet devices and a third position for connecting only the second named magnet device to said switch means.

10. A power control mechanism, comprising, movable abutment means having a neutral position and controlled by the differential in pressures in two chambers, said abutment means being movable from said neutral position in one direction to one operating position upon supply of fluid under pressure to one of said chambers and the venting of the other, and being movable in the opposite direction from neutral position to another operating position upon supply of fluid under pressure to the said other chamber and the venting of the first named chamber, a magnet device operative upon energization to supply fluid under pressure to the first named chamber and upon deenergization to vent same, a second magnet device operative upon energization to supply fluid under pressure to the second named chamber and upon deenergization to vent same, a spring, locking means operative by said spring to cooperate with said abutment means in said neutral position for securing same against movement, and adapted to be operated by fluid under pressure to a release position for releasing said abutment means for movement, said abutment means in all positions except said neutral position being adapted to maintain said locking means in its release position, a third magnet device operative upon energization to supply fluid under pressure to said locking means for effecting movement thereof to its release position and upon deenergization to vent fluid under pressure therefrom, a manually operable switch device, a source of electrical current having a direct connection with said switch device, switch means associated with said locking means and operative in the release position thereof to provide another connection between said source of current and said switch device and operative to break such connection upon movement of said locking means to its locking position, said manually operative switch device having the following positions arranged in the order named for controlling said magnet devices, a first position for connecting the third named magnet device directly to said source of current and for connecting the first named magnet device to said switch means, a second position for effecting deenergization of said magnet devices, a third position for connecting the second named magnet device to said switch means, a fourth position for connecting the first named magnet device to said switch means, a fifth position for effecting deenergization of all of said magnet devices, and a sixth position for connecting the third named magnet directly to said source of current and the second named magnet device to said switch means.

11. A power control mechanism, comprising, movable abutment means having a neutral position and controlled by the differential in pressures in two chambers, said abutment means being movable from said neutral position in one direction to one operating position upon supply of fluid under pressure to one of said chambers and the venting of the other, and being movable in the opposite direction from neutral position to another operating position upon supply of fluid under pressure to the said other chamber and the venting of the first named chamber, a magnet device operative upon energization to supply fluid under pressure to the first named chamber and upon deenergization to vent same, a second magnet device operative upon energization to supply fluid under pressure to the second named chamber and upon deenergization to vent same, a spring, locking means operative by said spring to cooperate with said abutment means in said neutral position for securing same against movement, and adapted to be operated by fluid under pressure to a release position for releasing said abutment means for movement, said abutment means in all positions except said neutral position being adapted to maintain said locking means in its release position, a third magnet device operative upon energization to supply fluid under pressure to said locking means for effecting movement thereof to its release position and upon deenergization to vent fluid under pressure therefrom, a manually operable switch device, a source of electrical current having a direct connection with said switch device, switch means associated with said locking means and operative in the release position thereof to provide another connection between said source of current and said switch device and operative to break such connection upon movement of said locking means to its locking position, said manually operative switch device having the following positions arranged in the order named for controlling said magnet devices, a first position for connecting the third named magnet device directly to said source of current and for connecting the first named magnet device to said switch means, a second position for effecting deenergization of said magnet devices, a third position for connecting the second named magnet device to said switch means, a fourth position for connecting the first named magnet device to said switch means, a fifth position for effecting deenergization of all of said magnet devices, and a sixth position for connecting the third named magnet directly to said source of current and the second named magnet device to said switch means, and spring means arranged to act on said manually operated switch device in the first and last named positions thereof for automatically moving same from the first named position to the second named position or from the sixth named position to the fifth named position upon release of manual force on said switch device.

12. A control mechanism comprising in combination with a source of fluid at a pressure different than atmospheric pressure, movable abutment means having a neutral position and adapted to be moved therefrom in one direction to one operating position upon connecting a first chamber with said source and in the opposite direction to another operating position upon connecting a second chamber with said source, locking means arranged to cooperate with said abutment means in said neutral position to secure same against movement and movable to release position upon connecting a third chamber with said source for releasing said abutment means for movement, said abutment means when out of neutral position being operative to maintain said locking means in said release position, and manual control means having one position for effecting communication between said source and the first and third chambers, another position for equalizing the pressures of fluid in said first and second chambers and a third position for connecting only said second chamber to said source and means associated with said locking means and operative in the release position thereof to cooperate with said manual control means to establish the said connections between said source and said first and second chambers, the last named means being operative to prevent establishing said connections when said locking means is in the position securing said abutment means against movement.

13. A control mechanism comprising in combination with a source of fluid under pressure, movable abutment means having a neutral position and movable therefrom in one direction to one operating position upon supply of fluid under pressure from said source to one chamber and in the opposite direction from neutral position to another operating position upon supply of fluid under pressure from said source to another chamber, a spring, locking means operative by said spring into contact with said movable abutment means for cooperation therewith in neutral position to secure said abutment means against movement, said locking means being movable upon supply of fluid under pressure from said source to a third chamber to a release position to free said abutment means for movement, said abutment means in all positions except neutral position being operative to maintain said locking means in said release position, manually operative means arranged to connect the last named chamber either with said source or with the atmosphere, and means associated with said locking means and operative only in the release position thereof to cooperate with said manually operative means for opening communication between either the first or second named chambers and said source, the means associated with said locking means being adapted in the locking position thereof to render said manually operative means ineffective to open communication between the first or second named chambers and said source.

14. A control mechanism comprising in combination with a source of fluid under pressure, movable abutment means having a neutral position and being adapted to be moved therefrom in one direction to one operating position upon supply of fluid under pressure to one chamber and in the opposite direction to another operating position upon supply of fluid under pressure to another chamber, valve means for selectively controlling the supply of fluid under pressure from said source to said chambers and the release of fluid under pressure therefrom, means in the communications between said valve means and each of said chambers providing for relatively rapid flow of fluid under pressure to the chamber and a relatively restricted release of fluid under pressure therefrom, spring actuated means arranged to cooperate with said movable abutment means in the neutral position thereof for securing same against movement and movable to a release position upon supply of fluid under pressure to a third chamber for freeing said abutment means for movement, said abutment means being adapted in all positions except neutral to maintain said locking means in said release position, a valve device for supplying fluid under pressure to said third chamber and for releasing fluid under pressure therefrom, a manually operative device for selectively controlling the operation of said valve means and valve device, and means associated with said locking means and operative in the release position thereof to render said valve means responsive to operation of said manually controlled device, said valve means being non-responsive to operation of said manually controlled device when said locking means is in said locking position, and said valve device being controlled by said manually operative device independently of said locking means.

15. A control mechanism for a vehicle, comprising in combination, movable abutment means having a neutral position and adapted to be moved therefrom in one direction to one operating position upon supply of fluid under pressure to one chamber and in the opposite direction to another operating position upon supply of fluid under pressure to another chamber, locking means adapted to cooperate with said movable abutment means in the neutral position thereof for securing same against movement and adapted to be moved to a release position by fluid under pressure supplied to a third chamber for releasing said abutment means for movement, said abutment means in all positions except neutral being adapted to maintain said locking means in said release position, a magnet device for controlling the pressure in each of said chambers, each of said magnet devices being operative upon energization to supply fluid under pressure to the connected chamber and upon deenergization to vent fluid under pressure therefrom, a first wire connected to said magnet device controlling the fluid pressure in said first chamber, a second wire connected to said magnet device controlling the pressure in said second chamber, a third wire connected to said magnet device controlling the pressure in said third chamber; a manually operable switch device, said first, second and third wires being connected to said switch device, a source of electric current, a current supply wire connected with said source and switch device, a current return wire connected to said supply wire, an interlock switch associated with said locking means controlling a circuit between said current return wire and said manually operative switch device and being operable in the locking position of said locking means to open said circuit and in the release position of said locking means to close said circuit, said manually operative device being operative to selectively connect and disconnect said supply wire and said third wire for controlling the supply and release of fluid under pressure to and from said third chamber and for selectively connecting said first and second wires with said interlock switch for controlling the pressure of fluid in said first and second chambers.

16. A control mechanism comprising in combination, a source of fluid pressure, movable abutment means having a neutral position and adapted to be moved therefrom in one direction to one operating position upon supply of fluid under pressure to one chamber and in the opposite direction to another operating position upon supply of fluid under pressure to another chamber, manually operable means for selectively supplying fluid under pressure to either one or the other of said chambers, a spring, locking means operative by said spring to cooperate with said abutment means in the neutral position thereof for securing said abutment means against movement, means conditionable by said abutment means when out of said neutral position to render said locking means ineffective, said manually operable means being operative to supply fluid under pressure to another chamber for releasing said locking means from said abutment means to provide for movement of said abutment means out of said neutral position.

17. A control mechanism comprising in combination, a source of fluid pressure, movable abutment means having a neutral position and adapted to be moved therefrom in one direction to one operating position upon supply of fluid under pressure to one chamber and in the opposite direction to another operating position upon supply of fluid under pressure to another chamber, manually operable means for selectively supplying fluid under pressure to either one or the other of said chambers, a spring, locking means operative by said spring to cooperate with said abutment means only in the neutral position thereof for securing said abutment means against movement, said manually operable means being operative to supply fluid under pressure to another chamber for releasing said locking means from said abutment means, and means associated with said locking means for controlling the operation of said manually operable means to supply fluid under pressure to the first two named chambers and being operative when said locking means is released from said abutment means to provide for such supply and when securing said abutment means against movement rendering said manually operable means inoperative to supply fluid under pressure to said chambers.

18. A control mechanism comprising in combination, a source of fluid pressure, movable abutment means having a neutral position and adapted to be moved therefrom in one direction to one operating position upon supply of fluid under pressure to one chamber and in the opposite direction to another operating position upon supply of fluid under pressure to another chamber, manually operable means for selectively supplying fluid under pressure to either one or the other of said chambers, a spring, locking means operative by said spring to cooperate with said abutment means only in the neutral position thereof for securing said abutment means against movement, said manually operative means having one position for effecting the supply of fluid under pressure to said first named chamber and also to a third chamber for releasing said locking means from said abutment means, and another position for effecting a supply of fluid only to said second named chamber, and spring means operative to automatically move said manually operative means from the first named position to a third and intermediate position for cutting off the supply of fluid under pressure to all of said chambers and for venting same.

19. A control mechanism, comprising, a reciprocatory motor means having a neutral position and being movable therefrom in one direction to one operating position upon a variation in pressure in one chamber and in the opposite direction to another operating direction upon a variation in pressure in another chamber, locking means having a locking position to cooperate with said motor means in said neutral position to secure said motor means against movement and being operative upon a variation in fluid pressure in a third chamber to a release position for releasing said motor means for movement, electrically controlled means for controlling the pressure of fluid in the first two named chambers, other electrically controlled means for controlling the pressure of fluid in said third chamber, manually operative means for selectively connecting one or the other of said electrically controlled means to a source of electric current for effecting movement of said motor means to a desired position, switch means associated with said locking means and operative in the release position thereof to close a circuit between said source of current and said manually operative means to render said manually operative means effective to control the operation of the first named electrically controlled means, said switch means opening said circuit in said locking position, said manually operative means being operative to control a circuit between said source and the second named electrically controlled means independently of said switch means, a pair of wires, one of said wires being connected to said source of current, a signal indicating device connected to the other wire, means electrically connecting said wires, said switch means also controlling the circuit through said other wire and said signal device and operating to close same in the locking position of said locking means and to open same in the release position of said locking means.

20. A control mechanism, comprising, a reciprocatory motor means having a neutral position and being movable therefrom in one direction to one operating position upon a variation in pressure in one chamber and in the opposite direction to another operating position upon a variation in pressure in another chamber, locking means having a locking position to cooperate with said motor means in said neutral position to secure same against movement and being movable upon a variation in fluid pressure in a third chamber to a release position for releasing said motor means for movement, electrically controlled means for controlling the pressure of fluid in the first two named chambers, other electrically controlled means for controlling the pressure of fluid in said third chamber, manually operative means for selectively connecting one or the other of said electrically controlled means to a source of electric current for effecting movement of said motor means to a desired position, switch means associated with said locking means controlling the supply of current from said source to said manually operative means and operative in the release position of said locking means to supply said current to said manually operative means to render same effective to control the operation of the first named electrically controlled means, said switch means cutting off said supply of current from said source to said manually controlled means in the locking position of said locking means, said manually operative means being operative to control the second named electrically controlled means independently of said switch means, a pair of wires, one of said wires being connected to said source of current, a signal indicating device connected to the other wire, means electrically connecting said wires, said switch means also controlling the circuit through the said other wire to said signal device and operating to close same in the locking position of said locking means and to open same in the release position of said locking means, the circuit controlled by said switch means for supplying current to said manually operative device being through a third wire, means electrically connecting said third wire to said wire connected to said source of current, said switch means being located between the last named electrical connecting means and said manually operated device.

21. A power control mechanism, comprising power means having two operating positions and being movable by a differential in fluid pressures in two chambers to one of said two positions and upon a reversal of said differential to the other of said two positions, locking means operative to lock said power means in the said other of said two positions, and manually operated means movable to one position for releasing said locking means from said power means and cooperative with said locking means only upon release thereof to create said differential of fluid pressures, said manually operated means being movable to another position for cooperating with said locking means to effect said reversal of differential, said locking means being operative automatically to destroy the differential of fluid pressures on said power means in the second named position of said power means, said manually operated means being movable to a third position for destroying the differential in pressures on said power means.

PHILIP L. CRITTENDEN.